(12) United States Patent
Peletz

(10) Patent No.: US 12,537,823 B2
(45) Date of Patent: Jan. 27, 2026

(54) RIGHTSIZING PERMISSION SETS IN A CLOUD-BASED 5G NETWORK

(71) Applicant: DISH Wireless L.L.C., Englewood, CO (US)

(72) Inventor: Brian Peletz, Englewood, CO (US)

(73) Assignee: Boost SubscriberCo L.L.C., Englewood, CO (US)

( * ) Notice: Subject to any disclaimer, the term of this patent is extended or adjusted under 35 U.S.C. 154(b) by 330 days.

(21) Appl. No.: 18/176,936

(22) Filed: Mar. 1, 2023

(65) Prior Publication Data

US 2023/0336562 A1    Oct. 19, 2023

Related U.S. Application Data

(60) Provisional application No. 63/331,149, filed on Apr. 14, 2022.

(51) Int. Cl.
*H04L 9/40* (2022.01)

(52) U.S. Cl.
CPC .......... *H04L 63/104* (2013.01); *H04L 63/102* (2013.01)

(58) Field of Classification Search
CPC ............................ H04L 63/104; H04L 63/102
See application file for complete search history.

(56) References Cited

U.S. PATENT DOCUMENTS

| | | | | |
|---|---|---|---|---|
| 10,282,557 B1* | 5/2019 | Pore | ................... | H04L 63/1425 |
| 10,944,758 B1* | 3/2021 | Nagargadde | ........ | G06F 21/6218 |
| 12,143,398 B1* | 11/2024 | Durand | ................ | H04L 63/107 |
| 2017/0201525 A1* | 7/2017 | Biller | ...................... | H04L 63/08 |
| 2018/0097849 A1* | 4/2018 | Arquero | ................ | H04L 63/105 |
| 2019/0007415 A1* | 1/2019 | Kliger | ................... | H04L 63/104 |
| 2019/0327271 A1* | 10/2019 | Saxena | ................... | H04L 41/16 |
| 2020/0106780 A1* | 4/2020 | Malliah | ................ | G06F 16/437 |
| 2020/0329066 A1* | 10/2020 | Kirti | .................. | H04L 63/1416 |
| 2021/0144144 A1* | 5/2021 | Parks | ....................... | G06N 7/01 |
| 2021/0194913 A1* | 6/2021 | Hecht | .................. | H04L 63/105 |
| 2021/0203687 A1* | 7/2021 | Rabin | .................. | H04L 63/105 |
| 2021/0266323 A1* | 8/2021 | Jani | ........................ | G06N 20/00 |
| 2022/0247776 A1* | 8/2022 | Hecht | ................ | H04L 63/1433 |
| 2022/0366039 A1* | 11/2022 | Hen | ........................ | H04L 63/10 |

* cited by examiner

*Primary Examiner* — Darshan I Dhruv

(74) *Attorney, Agent, or Firm* — KW Law, LLP

(57) ABSTRACT

Systems, methods, and devices for managing permissions generate a first list of excess permissions of a first user account belonging to a group, score a first account drift of the first user account based on the list of excess permissions, and generate a second list of excess permissions associated with a second user account belonging to the group. A second account drift of the second user account is scored based on the second list of excess permissions. A group consistency is scored based on the first account drift and the second account drift. A first new configuration of permissions for the first user account and the second user account is determined to increase the group consistency. Removing a permission from the first user account and the second user account implements the first new configuration. Removing the permission may include removing the first and second user accounts from the group.

18 Claims, 4 Drawing Sheets

RIGHTSIZING PERMISSION SETS IN A CLOUD-BASED 5G NETWORK

CROSS-REFERENCE TO RELATED APPLICATIONS

This application claims priority to U.S. Provisional Patent Application No. 63/331,149, filed on Apr. 14, 2022, and entitled "Rightsizing Permission Sets," which is incorporated herein by reference.

TECHNICAL FIELD

The following discussion generally relates to computer security, and in particular to maintaining permission groups and user permissions.

BACKGROUND

Wireless networks that transport digital data and telephone calls are becoming increasingly sophisticated. Currently, fifth generation ("5G") broadband cellular networks are being deployed around the world. These 5G networks use emerging technologies to support data and voice communications with millions, if not billions, of mobile phones, computers and other devices. 5G technologies are capable of supplying much greater bandwidths than was previously available, so it is likely that the widespread deployment of 5G networks could radically expand the number of services available to customers. This expansion will accompany an increased need for cybersecurity.

The principal of least privilege is a security approach in which a user has only the minimum level of access required to function in their role. Applying least privilege access tends to restrict user accounts from accessing or modifying data that they should not, whether intentionally or accidentally. Least privilege can be difficult to apply when user groups grow and shrink regularly, or when users come on and off the system regularly. Access permissions also tend to drift over time as user roles within a company change, or as access used by policy or process implementations deviate from planned access.

Examples of organizations that might struggle to implement least privilege include large organizations with high levels of frictional turnover, organizations that scale user groups up and down in size, organizations that dynamically access user accounts, or organizations that manually apply access controls. Cloud service providers and other security systems, for example, offer security suites that can assist certain users in applying least privilege under ideal conditions. However, existing tools may be insufficient for users with complex environments using atypical networking techniques such as cloud-based 5G telephone networks.

SUMMARY

Systems, methods, and devices tend to implement least privilege access by assessing and pruning access permissions available to user accounts. Some embodiments of an automated process for managing permissions include the steps of compiling a first list of permissions used by a first user account, compiling a second list of permissions granted to the first user account, subtracting the first list of permissions from the second list of permissions to generate a third list of excess permissions associated with the first user account. The process determines a first account drift of the first user account based on the third list of excess permissions. The automated process further includes the steps of compiling a fourth list of permissions used by a second user account, compiling a fifth list of permissions granted to the second user account, and subtracting the fourth list of permissions from the fifth list of permissions to generate a sixth list of excess permissions associated with the second user account. A second account drift of the second user account is determined based on the sixth list of excess permissions. A group drift is determined based on the first account drift and the second account drift. A first new configuration of permissions for the first user account and the second user account is generated in response to the group drift.

Various embodiments implement the first new configuration to reduce the group drift. The first new configuration removes a permission from the second list of permission granted to the first user account and from the fifth list of permissions granted to the second user account. The permission removed from the second list and the fifth list controls access to a virtual distributed unit. The group drift is reduced in response to removing the permission from the second list of permission granted to the first user account, and in response to removing the fifth list of permissions granted to the second user account. A consistency of a group is scored. The group comprises the first user account and the second user account, and the consistency is based on the first account drift and the second account drift. Consistency of a group is scored based on the third list of excess permissions associated with the first user account and based on the sixth list of excess permissions associated with the second user account. A second new configuration of permissions is identified in response to the scored consistency of the group. The second new configuration of permissions omits the first user account from the group. The second new configuration of permissions includes a new group, the new group including the first user account and the second user account as members.

Embodiments of an automated process for managing permissions may include the steps of generating a first list of excess permissions of a first user account belonging to a group, scoring a first account drift of the first user account based on the list of excess permissions, and generating a second list of excess permissions associated with a second user account belonging to the group. A second account drift of the second user account is scored based on the second list of excess permissions. The process further includes determining a group consistency based on the first account drift and the second account drift, identifying a first new configuration of permissions for the first user account and the second user account to increase the group consistency, and removing a permission from the first user account and the second user account to implement the first new configuration.

In various embodiments, a new group is created, and the new group includes the first user account and the second user account to implement the first new configuration. The permission is removed from the first user account and the second user account by removing the first user account and the second user account from the group. Removing the first user account and the second user account from the group revokes access to a virtual distributed unit. Group drift is scored based on the first and second account drifts. The first new configuration is identified in response to a group drift. The group drift is based on the first account drift and the second account drift. The group drift is based on the first list of excess permissions and the second list of excess permissions.

Various embodiments of a system for managing permissions include a permission repository running on a cloud-based network. A permission manager is running on the cloud-based network and in communication with the permission repository. The permission manager scores a first account drift using a first list of unused permissions associated with a first user account. The permission manager scores a second account drift using a second list of unused permissions associated with a second user account. The permission manager scores a group drift or a group consistency using the first account drift and the second account drift. the permission manager revokes a permission from the first user account and the second user account to reduce the group drift or increase the group consistency. An access control system is configured to read the permission from the permission repository and deny the first user account and the second user account access to a virtual distributed unit in response to the permission being revoked. In various embodiments, the permission manager generates a new configuration of permissions including a new group. The new group includes the first user account and the second user account as members in response to the group drift or the group consistency.

BRIEF DESCRIPTION OF THE DRAWINGS

The subject matter of the present disclosure is particularly pointed out and distinctly claimed in the concluding portion of the specification. A more complete understanding of the present disclosure, however, may be obtained by referring to the detailed description and claims when considered in connection with the illustrations.

DETAILED DESCRIPTION

Figure 1:
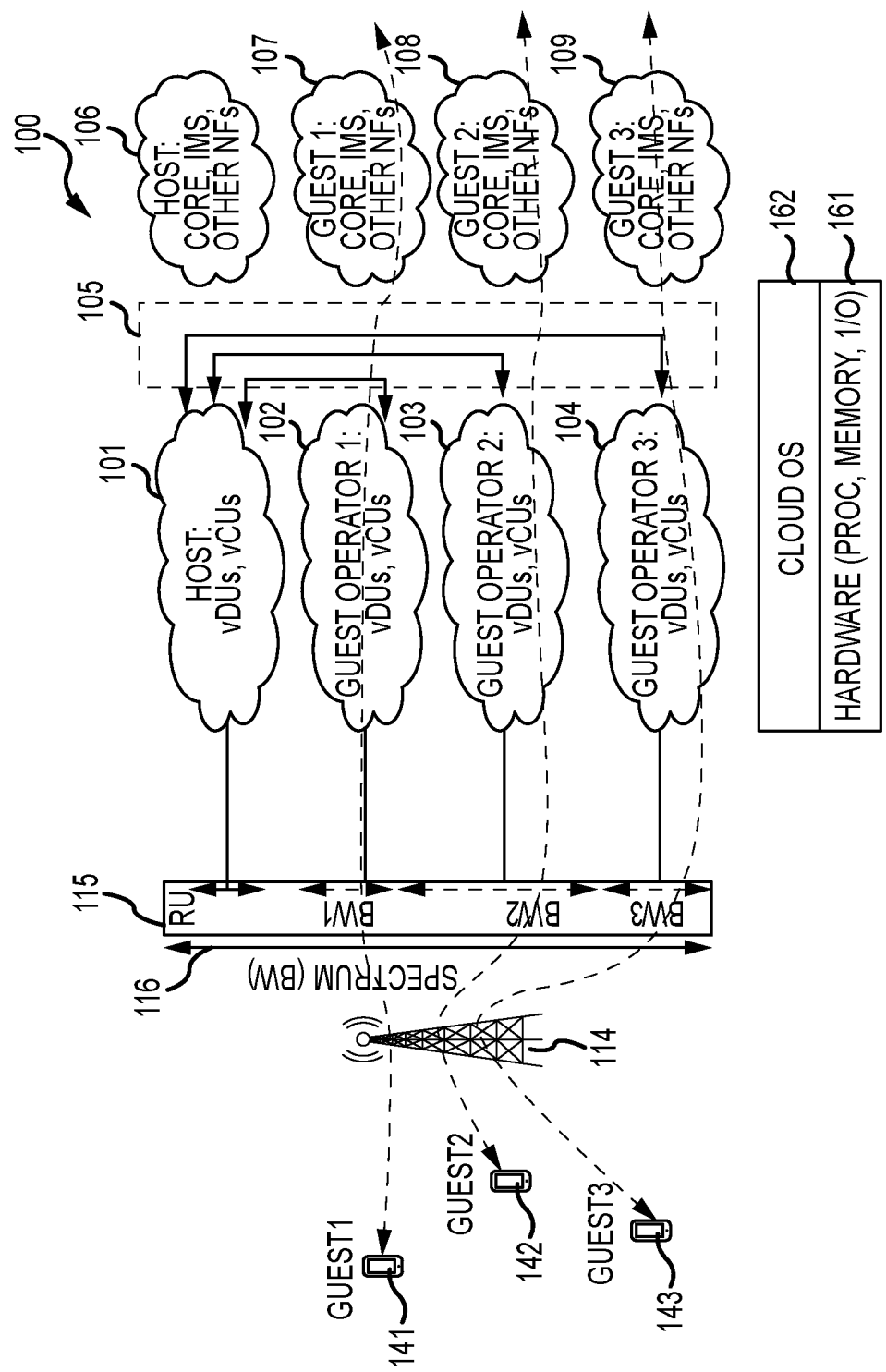
FIG. 1 illustrates an example of a 5G data and telephony network implemented as a cloud-based system, in accordance with various embodiments.

The following detailed description is intended to provide several examples that will illustrate the broader concepts that are set forth herein, but it is not intended to limit the invention or the application and uses of the invention. Furthermore, there is no intention to be bound by any theory presented in the preceding background or the following detailed description.

Systems, processes, and devices of the present disclosure manage access permissions in a cloud-based network. Various embodiments assess the degree to which granted permissions implement least privilege access for individual user accounts and across permission groups. User accounts include the accounts typically assigned to workers or other automated processes. User accounts also include those used by individual human users. Granted permissions can also be applied to permissions groups, to which users can be added and removed. A list of granted permission is pulled and compared to recommended permissions. The permissions are evaluated on a per user account basis. Permissions can also be evaluated across the entire distribution of user accounts in a permissions group to calculate a drift score.

The term drift generally refers to the difference between granted permissions and used permissions. As used herein, the phrase "account drift" refers to the deviation or difference between permissions granted to a user account and permissions used by the same user account. Account drift can be assessed based on a subset of permissions granted to the account, based on all permissions granted to the account, or based on permissions granted based on group membership, for example. Account drift may be represented numerically as a count of used or unused permissions, and account drift may further include comparison to a count of permissions granted. For example, an account that uses 4 permissions, has access to 5 permissions, and does not use 1 permission may have an account drift of 1 or 20% based on unused permissions (4 or 80% if calculating based on used permissions).

As used herein, the phrase "group drift" as applied to a permission group refers to an aggregation of account drift for member accounts usable to assess consistency of the permission group. Group drift may be assessed based on access permissions granted to user accounts due to membership in the group. Group drift can be represented numerically as a standard deviation of account drifts for each account in the group, for example. Group drift may also be embodied in a list of permissions that are granted to at least one account in the group and not used by any account in the group. Group drift may further be assessed numerically by counting the number of accounts that use or do not use each permission granted to the group, and group drift may include comparison to the total number of accounts in the group.

Access drift is calculated per account by comparing the current set of granted permissions of a user account with a recommended set of permissions for the user account. The recommended set of permissions may be based on actual access used, on planned access, or on baseline permissions, for example. The recommended permissions may thus exclude permissions that the user does not use or uses infrequently, though other filters may be used as criteria to omit permissions from the recommended permissions. The list of recommended permissions may also include permissions that a user attempts to use but does not have.

Various embodiments aggregate access drift a across multiple accounts to assess consistency. Sorting or grouping of accounts for aggregation is customizable. Drift consistency is identified in some embodiments by evaluating the consistency with which permissions are used across accounts in a group. Recommended 'variation' may be used to align account sets with common permission usage to share a permission set across a group of accounts.

With reference now to FIG. 1, an example of a cellular communication system 100 is shown, in accordance with various embodiments. Cellular communication system 100 is implemented on cloud-based infrastructure to facilitate dynamic network adaptations. Cellular communication system 100 includes a host operator maintaining ownership of one or more radio units (RUs) 115 associated with a wireless network cell. The example of FIG. 1 depicts a host operator operating a "radio/spectrum as a service (R/SaaS)" that allocates bandwidth on its own radio units for use by one or more guest network operators, though the systems, methods, and devices described herein could be applied to any wireless network using virtualized network services. Examples of guest network operators may include internal brands of the host operator, system integrators, enterprises, external MVNOs, or converged operators. The host and the guest network operators may maintain desired network services to support user equipment (UE) 141, 142, 143.

The host and MVNOs may have their own user accounts and permission groups for various roles within cellular communication system 100. User accounts may be provisioned and deprovisioned frequently as virtualized assets come online and go offline. Human users associated with the entities operating cellular communication system 100 typically have accounts and group permissions that should change as the role of human users evolves and changes. Stagnant permissions on user groups tend to result in permission drift, with users having greater access than necessary.

In the example of FIG. 1, each RU 115 communicates with UE 141, 142, 143 operating within a geographic area using one or more antennas 114 (also referred to herein as towers) capable of transmitting and receiving messages within an assigned spectrum 116 of electromagnetic bandwidth. In various embodiments, guest networks 102, 103, 104 interact with a provisioning plane 105 to obtain desired spectrum (e.g., portions of bandwidth 117, 118, 119 respectively) across one or more of the RUs 115 operated by the host 101. Provisioning plane 105 allows guest network operators to obtain or change their assigned bandwidths on different RUs 115 on an on-demand and dynamic basis. Network services 107, 108, 109 may be maintained by guest operators and network services 106 may be maintained by host 101. Network services and corresponding user accounts may be scaled up and down in response to network load, and permission management for user accounts within the system are applied as described herein.

The Open RAN standard breaks communications into three main domains: the radio unit (RU) that handles radio frequency (RF) and lower physical layer functions of the radio protocol stack, including beamforming; the distributed unit (DU) that handles higher physical access layer, media access (MAC) layer and radio link control (RLC) functions; and the centralized unit (CU) that performs higher level functions, including quality of service (QoS) routing and the like. The CU also supports packet data convergence protocol (PDCP), service data adaptation protocol (SDAP) and radio resource controller (RRC) functions. The RU, DU and CU functions are described in more detail in the Open RAN standards, as updated from time to time, and may be modified as desired to implement the various functions and features described herein. In the example of FIG. 1, host 101 maintains one or more DUs and CUs (i.e., network functions) as part of its own network. The DU communicates with one or more RUs 115, as specified in the Open RAN standard.

The various network components shown in FIG. 1 are typically implemented using software or firmware instructions that are stored in a non-transitory data storage (e.g., a disk drive or solid-state memory) for execution by one or more processors. The various components shown in FIG. 1 can be implemented using cloud-based hardware 161 and an appropriate operating system 162 such as the Amazon® Web Service (AWS) platform offered by Amazon Inc., although other embodiments could use other cloud platforms or any type of conventional physical computing hardware 161, as desired.

As illustrated in the example of FIG. 1, system 100 includes a host network 101 and one or more guest networks 102, 103, 104. The host network 101 is typically operated by an organization that owns radio equipment and sufficient spectrum (potentially on different bands) to offer 5G capacity and coverage. Host network 101 provides 5G service to connected UEs, and it manages network services available to its own UEs or those of its guest operators. Host network 101 includes at least one DU and at least one CU, both of which will typically be implemented as virtual computing units using cloud resources. Virtual DUs and virtual CUs may be associated with user accounts and group permissions that manage access.

Guest networks 102, 103, 104 operated by guest operators can manage their own networks using allocated portions of spectrum 116 handled by one or more of the RUs 115 associated with the host 101. The guest networks 102, 103, 104 communicate with one or more UEs 141-143 using allocated bandwidth 117, 118, 119 on the host's RU 115. Guest networks 102, 103, 104 may include one or more virtual DUs and CUs, as well as other network services 106, 107, 108, 109 variously associated with user accounts and group permissions, as desired. Generally, one or more guest operators will instantiate its own 5G virtualized network functions (e.g., CMS, vCUs, vDUs, etc.) using cloud-based resources, as noted above. However, various embodiments may operate outside of cloud-based environments.

Each RU 115 is typically associated with a different wireless cell that provides wireless data communications to user devices 141-143. RUs 115 may be implemented with radios, filters, amplifiers and other telecommunications hardware to transmit digital data streams via one or more antennas 114. Generally, RU hardware includes one or more processors, non-transitory data storage (e.g., a hard drive or solid-state memory) and appropriate interfaces to perform the various functions described herein. RUs are physically located on-site with the transmitter/antenna 114, as appropriate. Conventional 5G networks may make use of any number of wireless cells spread across any geographic area, each with its own on-site RU 115.

RUs 115 support wireless communications with any number of user devices 141-143. UE 141-143 are often mobile phones or other portable devices that can move between different cells associated with the different RUs 115, although 5G networks are also widely expected to support home and office computing, industrial computing, robotics, Internet-of-Things (IoT) and many other devices. While the example illustrated in FIG. 1 shows one RU 115 for convenience, a practical implementation will typically have any number of virtualized RUs 115 that can each be individually configured to provide highly configurable geographic coverage for a host or guest network, if desired. Host 101 and guest operators 102, 103, 104 can automatically scale and manage network services with least privileged access using the techniques described herein.

Figure 2:
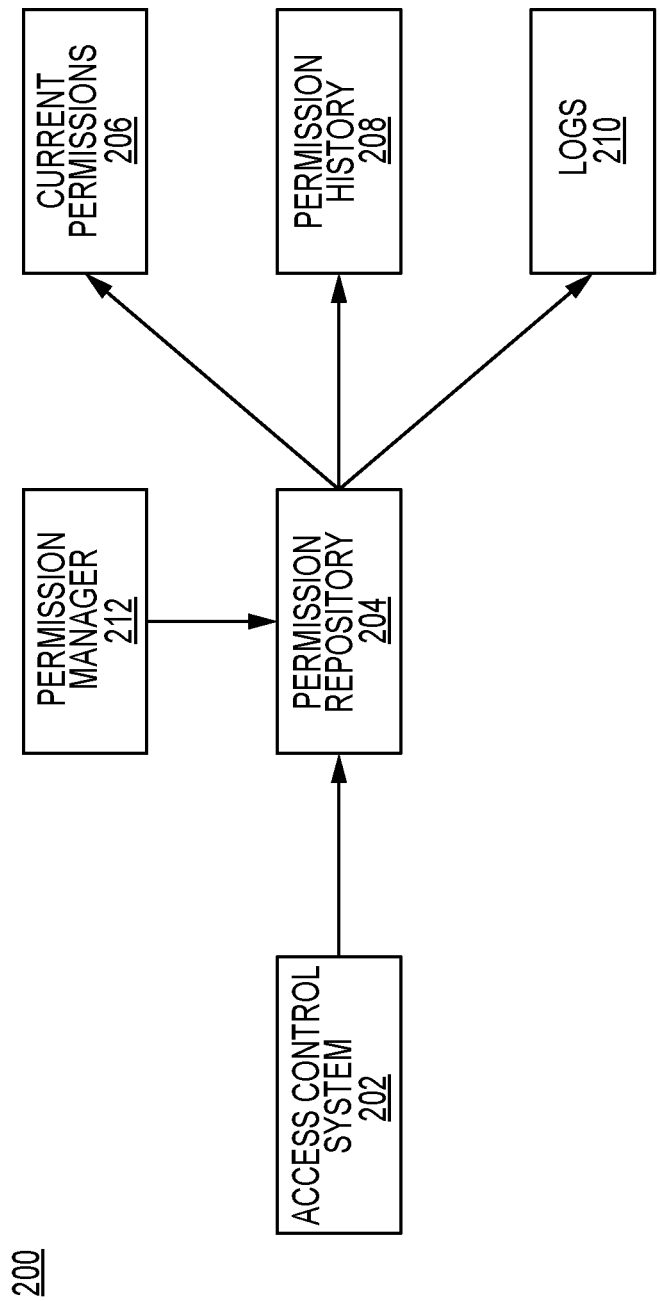
FIG. 2 illustrates an example of a permission management system for assessing drift in account permissions and pruning superfluous permissions, in accordance with various embodiments.

Referring now to FIG. 2, an example permission management system 200 is shown, in accordance with various embodiments. Permission management system 200 may run on the same cloud-based hardware 161 and operating system 162 as the 5G data and telephone network of system 100, as depicted in FIG. 1. Access control system 202 implements permission-based access controls to restrict access to virtual machines, files, computing device, and other resources available on system 100. Access control system 202 access permission repository 204 to read, write, and modify access permissions 208, permission history 208, and logs 210.

In response to a user account attempting to access a resource, access control system 202 reads the permissions of the user account and checks for access to the requested resource. Access control system allows access in response to the user account having requisite permissions. Access control system denies access in response to the user account lacking requisite permissions. Access attempts are logged in logs 210 whether successful or unsuccessful along with timestamps, user accounts, resource identifiers, access type (e.g., read, write, execute, login) and other metadata relevant to the access attempt.

In various embodiments, permission manager 212 is in electronic communication with permission repository 204 to assess user permissions for drift, consistency, and recent use. Permission manager 212 may automatically modify user permissions in some embodiments, though permission manager 212 may also output analysis for manual actioning by human users, other workers, or other computing devices. In embodiments implemented on AWS cloud services, permission manager 212 may retrieve information from access repository 204 using the AWS Identity and Access Management Access Analyzer. Tools such as Access Analyzer from AWS may generate a list of permissions used for a given account based on application programming interface (API) calls made by the account.

In various embodiments, permission repository 204 may also compile a list of access permissions used for by account using logs 210. In the AWS example, access analyzer returns policy statements in a JSON structure based on past API calls associated with an account. If the user account historically has not made an API call, then the permission associated with the API call does not show up in the recommended permissions (i.e., the permissions used by the account).

Permission manager 212 retrieves the recommended permissions from permission repository 204 or a tool as described above. In some embodiments, permission manager 212 retrieves the history of access attempts made by an account from logs 210 and makes a list of all permissions used by the account. The list of permissions used by the account may be used as a list of recommended permissions by permission manager 212. The list of permissions used by the account may be time-bound (e.g., permissions used in the past month, past quarter, past year, ever, since a designated date, or other suitable time filters). The list of permissions used may also be filtered based on access type (e.g., read, write, execute, login). For example, in systems where read access is not sensitive, permission manager 212 may retrieve a list of write, execute, and login permissions used. Other metadata associated with logs of historical login attempts may be used to filter the recommended permissions list as desired.

In various embodiments, permission manager 212 retrieves a list of current permissions 208 associated with a user account or user group. The recommended (i.e., used) permissions associated with an entity are compared with the current permissions granted to the entity. Permission manager 212 may subtract the recommended permissions from the current permissions granted to the entity to identify excess (i.e., unused) permissions. As used in the context of comparing permissions lists, the term subtract means removing permissions from a first list that appear on a second list resulting in a third list, with the third list being the remainder of the first list after removing permissions included on the second list. For example, the list of excess permissions is the result of subtracting the recommended permissions from the granted permissions. The operation could also be described as taking a diff or difference between the list of granted permission list and the list of recommended permissions. Permissions listed as excess permissions are candidates for removal or modification on the user account or permission group.

User accounts may be assigned an account drift score by assigning a numeric value representing the level of similarity (or difference) between the list of granted permissions and the list of recommended permissions. The account drift score may be a ratio of the number of permissions present on the granted permissions list to the number of permissions present on the recommended permissions list (e.g., a usage ratio). The account drift score may be a ratio of the number of permissions present on the granted permissions list to the number of permissions present on the list of excess permissions (e.g., an unused ratio). The account drift score may also be the difference between a number of permissions on the list of granted permissions and the number of permissions on the list of recommended permissions (e.g., an unused count). The foregoing examples of account drift scores are examples, and any number of drift calculations could be used in various embodiments.

With permission sets distributed across multiple accounts in a group, permission manager 212 evaluates permissions across groups for consistency, in various embodiments. Groups are then adjusted by changing group membership, dividing or combining groups, or by changing permissions granted to the group. Further to the account drift scores described above, the drift metrics can be used to evaluate the consistency of permissions consumed and deviation from recommended settings group wide. The additional metric can be leveraged to align account sets with common permission usage to share a permission set.

Results can be presented to users using differential presentation techniques to highlight consistent or inconsistent permission settings. Consistent settings may tend to match granted permissions with recommended permissions. Consistent settings may also be permissions settings that are similar between members of a permission group. Risk scoring may be used in some embodiments. Permissions may be recommended for removal in response to a risk score above a threshold value, which is based on the sensitivity of a particular file or asset protected by the access permission being scored. For example, access to a vDU or vCU may be sensitive and may merit tighter controls on access permissions. Permissions to access a vDU or vCU may thus have a higher risk score associated with them than permissions for read only access to a read-me file.

Changes to group membership, combinations of groups, or splitting groups may also be suggested or implemented by testing the proposed group memberships using the techniques described above for a proposed group. Access manager 212 iterates through potential groups to identify group compositions having improved permission consistency across the group. Access manager 212 modifies current permissions 206 to implement identified permissions groups and settings.

Figure 3:
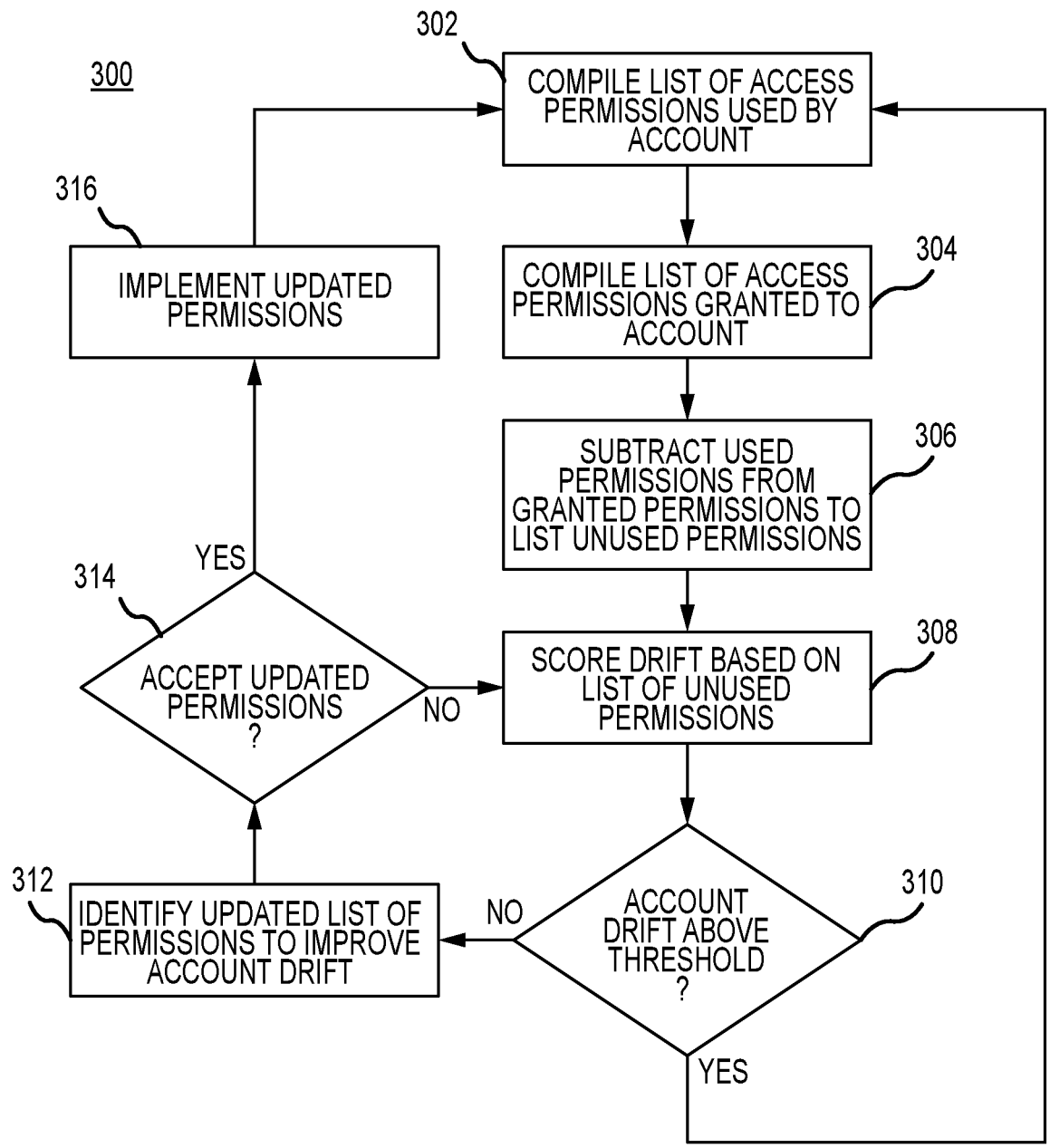
FIG. 3 illustrates an example of a process for assessing drift in account permissions and pruning superfluous permissions, in accordance with various embodiments.

Referring now to FIG. 3, automated process 300 is shown for execution by system 200 to manage account drift, in accordance with various embodiments. A list of access permissions used by a user account is compiled (Block 302). The list of permissions used by the account are permissions associated with resources that the account has accessed. The list may include access or access attempts made over a selectable or predetermined period of time by the user account. The list may be compiled by searching access logs. The list may also be compiled by making a function call or application programming interface (API) call to retrieve the list.

In various embodiments, a list of access permissions granted to the user account is also compiled (Block 304). The list of access permissions granted to the user account can be compiled by pulling a list of all current access permissions using a function call or API call. The list of access permissions may also be compiled by retrieving current permissions 206 associated with the user account from permissions repository 204.

In various embodiments, the list of permissions used by the account are subtracted from the list of permissions granted to the account to generate a list of excess or unused permissions (Block 306). The difference includes a list of permissions the account has granted but does not use or uses infrequently, depending on operating parameters of permission manager 212. The difference between the used permissions and granted permissions may be used to calculate an account drift score for the account (Block 308). The access drift score may be a ratio or percentage of the number of granted permissions relative to the number of used permissions. The drift score is typically based on the number of access permissions that are granted but unused over the tracked period.

In various embodiments, permission manager 212 may check whether the account drift is above a threshold value (Block 310). Permission manager may also check whether account drift is below a threshold value depending on the drift scoring technique used. By comparing the drift score to the threshold value, permission manager 212 determines whether an account has an acceptable drift score or whether the account drift is sufficient to trigger permission adjustments. In response to the drift score being above the threshold (i.e., the account has an acceptable level of drift), permission manager 212 may terminate activity on the scored account until a drift assessment or other action is again triggered against the account.

Various embodiments of permission manager 212 identify an updated list of permissions that would improve account drift (Block 312) response to determining the account drift score is below the threshold value (i.e., an unacceptable level of account drift). An updated permissions list may be identified by removing or tightening permissions from the list of granted permissions available to the account being scored.

Permission manager 212 may identify potential updated permissions by considering all user accounts across system 100 of FIG. 1. Account drift may be grouped in subsets and supersets based on drift scores or lists of unused permissions associated with the accounts. Permissions manager 212 may select sub-sets of permissions for existing permission groups or new permission groups. Permission manager 212 may also adjust group membership for permission groups by adding or removing permissions. Permission manager 212 may be restricted to reducing permissions automatically. Permission manager 212 may by prohibited from modifying permissions of administrator accounts or other accounts as desired. Permission manager 212 may maintain a blacklist of unmodifiable accounts or account types or a whitelist of modifiable accounts to prevent undesirable changes. Changes may be output to a user for review and manual actioning. Permission manager 212 may also prompt a user for intervention or approval before making automatic changes.

In various embodiments, permission manager 212 may determine whether to update permissions by changing the granted permissions for the scored account to the updated permissions identified (Block 314). Potential updated permissions lists are compared to one another to identify an acceptable or desirable list of updated permissions. A potential updated list of granted permissions may be acceptable in response to having a drift score above the threshold value of block 310, for example. A drift score may be desirable in response to having a drift score above a higher threshold value than the acceptable threshold value. A potential updated list of granted permissions may also be desirable or acceptable in response to having a highest drift score among calculated potential updated lists of granted permissions.

In various embodiments, a list of updated permissions may also be accepted in response to an approval from a user. The user may be presented potential list of updated permissions from which to choose. The user may be presented with an automatically selected acceptable or desirable potential list of updated permissions to approve. Permissions manager 212 may also automatically update the granted permissions to the identified list of updated permissions without user intervention. In response to updating permissions without user intervention, permission manager 212 may send a notification to a user with an option to roll back the permission update. Permission manager 212 implements the updated permissions in response to acceptance of the updated permissions (Block 316).

Various embodiments of permission manager 212 may maintain a list of permissions that were automatically revoked from the scored user in permission repository 204. Access control system may check the list of permissions that were automatically revoked in response to a request by the scored account to use one of the permissions that were automatically revoked. In response to a user account attempting to use a permission from the list of permissions that were automatically revoked, access control system 202 may take a corrective action. Corrective actions may include notifying a user, automatically rolling back the permissions change, logging the access attempt with a flag indicating the permission resulting in denied access was automatically revoked, or other suitable corrective actions.

In various embodiments, the list of permissions automatically revoked may be time limited. For example, automatically revoked permissions may remain on the list for one day, one week, one month, one quarter, one year, or any other period desired. In that regard, the list of automatically revoked permissions tends to minimize the likelihood of unintended failures resulting from automatic permissions changes.

Adjusting permissions on an account-by-account basis may lead to unintended removal of access permission from an entire group, depending on the changes applied to affect the updated permissions. Various embodiments of permission manager 212 take a wholistic approach to adjusting group permissions by aggregating account drift and unused permission lists across permission group membership and outside of groups. With permission sets distributed across multiple accounts in a group, permissions can be assessed across groups for consistency and group drift. Further to the methods using account drift described above, the group drift metric can be used to evaluate the consistency of permissions consumed and deviation from recommended settings group wide. The additional metric can be leveraged to align account sets with common permission usage to share a permission set. Permission groups are adjusted to improve or optimize consistency or drift by changing group membership, dividing or combining groups, creating new groups, eliminating groups, or by changing permissions granted to the group.

Figure 4:
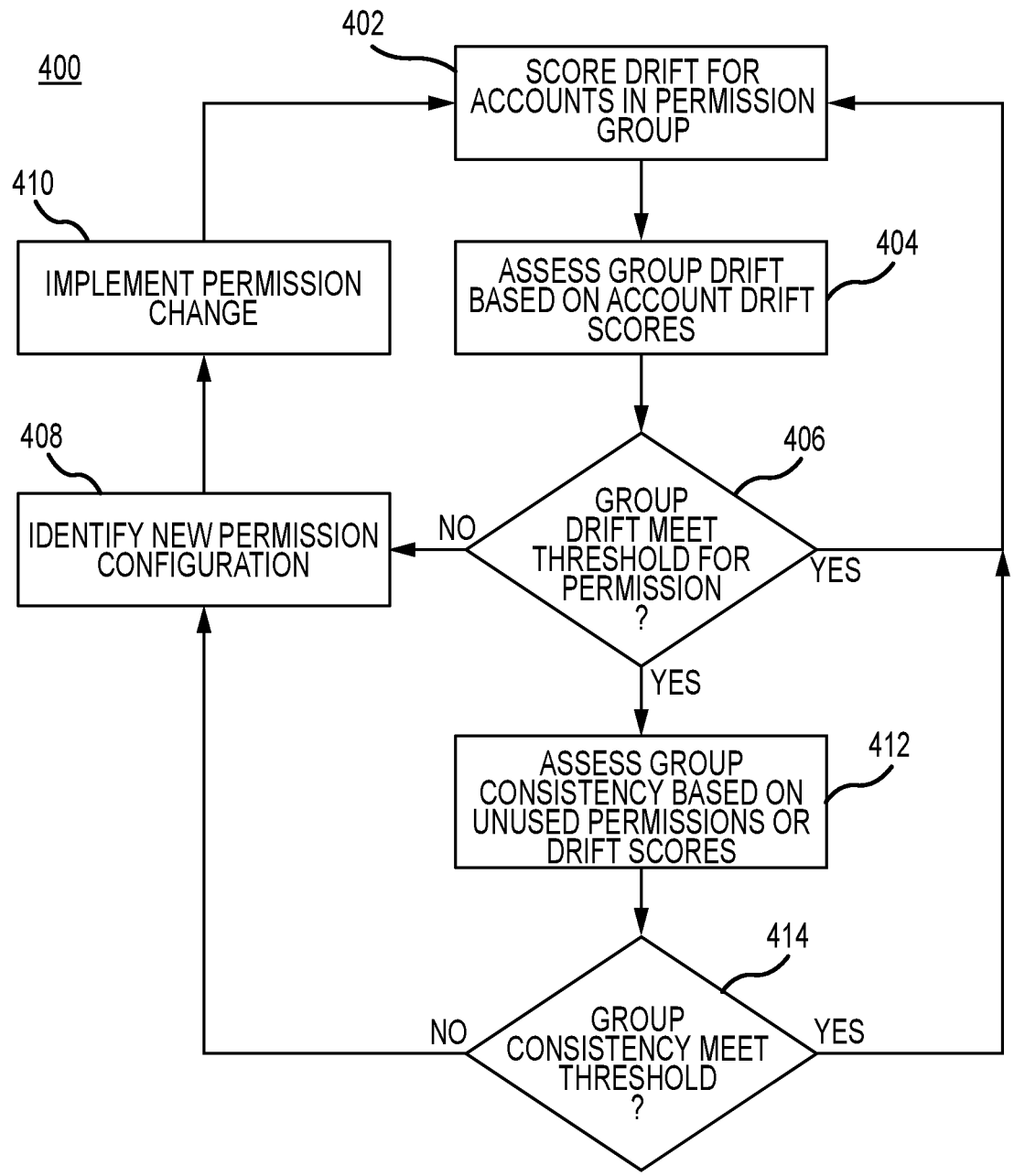
FIG. 4 illustrates an example of a process for assessing drift and consistency in group permissions to improve group permissions and structure, in accordance with various embodiments.

With reference to FIG. 4, process 400 for aggregating account drift is shown, in accordance with various embodiments. Process 400 may score the accounts in a permission group (Block 402). The permission group may simply be the group of all user accounts, or the permission group may include a specific subset of user accounts. In response to scoring the drift of a desired set of accounts, permission manager 212 may assess the group drift base on account drift scores (Block 404).

Various embodiments assess group drift on a per-permission basis by counting the number of accounts that do not use a permission. The unused permission list for each account may be used to count the number of accounts that do not use a permission available to a group. The number of accounts in a group that do not use a permission may be compared to the total number of accounts in the group to identify a nonuse ratio. For example, if a group of 20 accounts has access to a permission, and the permission is unused by 18 accounts, then the nonuse ratio is 90%.

Permission manager 212 also assess group drift on a per-permission basis by counting the number of accounts that use a permission to generate a use ratio, in various embodiments. The used permission list for each account may be used to count the number of accounts that do use a permission available to a group. The number of accounts in a group that do use a permission may be compared to the total number of accounts in the group to identify a use ratio. In another example, if a group of 20 accounts has access to a permission, and the permission is used by 2 accounts, then the use ratio is 10%. For each permission available to the group, permission manager 212 checks whether the group drift for the permission meets a threshold value (Block 406).

For example, permission manager 212 may automatically retracts permissions with a 0% use ratio or a 100% nonuse ratio. The threshold for nonuse or use ratios may be predetermined, and may trigger various actions. Permission manager 212 identifies a new permission configuration in response to determining drift does not meet a threshold value (Block 408). For example, a use rate of 20% for a permission may result in permission manager 212 identifying an improved configuration that includes creation of a new group for the scored permission with membership including the 20% of accounts that use the permission. Permission manager 212 may implement a permission change to improve permission scoring (Block 410). Continuing the example, the permission may be revoked from the original group in response to creating and populating the new group. Suitable thresholds for nonuse to trigger revocation or formation of a new group may include 0%, 5%, 10%, 40%, 60%, 80%, 90%, 95%, 100%, or any other desired threshold. Implementing a change may include outputting the potential changes in a new permission configuration to an interface for user review and action.

In various embodiments, permission manager 212 assess group consistency based on account drift scores or lists of unused permission of accounts in the group (Block 412). A group consistency score is generated for a permission group and comprises a numeric representation of how well an entire group aligns. The result may be determined and presented as jitter or a standard deviation, for example. Group consistency scores may thus reflect deviation from recommended permissions across the membership of a group. Permission manager 212 may use group drift or group consistency to reduce superfluous permissions granted in system 100 of FIG. 1.

The result of scoring group consistency may determine whether a group is 90% consistent, 80% consistent, 70% consistent, 60% consistent, or any other desired threshold value of consistency. Another example of a consistency threshold is a maximum or minimum acceptable value for standard deviation. In response to consistency not meeting a threshold (Block 414), permission manager identifies a new permission configuration that would result in improved group consistency (Block 408).

Permissions may be adjusted across the group to maximize consistency, or to reach consistency above a threshold value. Permissions that maximize or improve group consistency may be identified by iterating through potential permission settings for a group and comparing the potential settings to the use by accounts in the group membership for deviation, with the potential permissions replacing granted permissions in the process above to select the potential permissions with the least deviation or with reduced deviation. The same technique may be used to recommend or create new permissions groups with a deviation level above a predetermined consistency threshold. Permission manager 212 may create new groups, alter group membership, delete groups, or otherwise modify group structure. Permission manager 212 may also modify permissions available to groups by revoking or modifying permissions.

Similar accounts may be grouped together based on account drift or account use lists into subsets or supersets with deviation below a threshold value. Revisions to granted permissions may be generated for the account based on the differences, the account drift score, or the group drift score. The group access drift may be calculated by aggregating individual account drift scores using an aggregation function. Summation is an example of a suitable aggregation function. Permission manager 212 may be limited from modifying admin groups, root users, or other groups having elevated permissions. Permission manager 212 may also be restricted from modifying group membership of predetermined accounts, account types, groups, or group types. Permission manager may further be restricted to only reducing the total permissions available to an individual account when altering group structure or membership.

Systems, methods, and devices of the present disclosure may tend to implement the principal of least privilege. Unused access permissions are pruned from accounts and user groups to reduce the amount of excess permission present on the network. In a data and telephony network, the reduced permissions can limit access to sensitive infrastructure such as virtual DUs and virtual CUs. The reduced permissions also tend to reduce the risk of unwanted access between various MNVOs and host operators. As a result, systems using various embodiments described herein tend to have improved security posture and reduced attack surface.

Benefits, other advantages, and solutions to problems have been described herein with regard to specific embodiments. Furthermore, the connecting lines shown in the various figures contained herein are intended to represent exemplary functional relationships or couplings between the various elements. It should be noted that many alternative or additional functional relationships or connections may be present in a practical system. However, the benefits, advantages, solutions to problems, and any elements that may cause any benefit, advantage, or solution to occur or become more pronounced are not to be construed as critical, required, or essential features or elements of the inventions.

The scope of the invention is accordingly to be limited by nothing other than the appended claims, in which reference to an element in the singular is not intended to mean "one and only one" unless explicitly so stated, but rather "one or more." Moreover, where a phrase similar to "A, B, or C" is used herein, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or device that comprises a list of elements does not include only those elements but may include other elements not expressly listed or inherent to such process, method, article, or device.

The term "exemplary" is used herein to represent one example, instance, or illustration that may have any number of alternates. Any implementation described herein as "exemplary" should not necessarily be construed as preferred or advantageous over other implementations. While several exemplary embodiments have been presented in the foregoing detailed description, it should be appreciated that a vast number of alternate but equivalent variations exist, and the examples presented herein are not intended to limit the scope, applicability, or configuration of the invention in any way. To the contrary, various changes may be made in the function and arrangement of the various features described herein without departing from the scope of the claims and their legal equivalents.

What is claimed is:

1. An automated process for managing permissions, comprising:
    compiling a first list of permissions used by a first user account;
    compiling a second list of permissions granted to the first user account;
    subtracting the first list of permissions from the second list of permissions to generate a third list of excess permissions associated with the first user account;
    determining a first account-drift score of the first user account based on the third list of excess permissions;
    configuring the first user account with a first new configuration of permissions in response to the first account-drift score exceeding a first threshold value;
    compiling a fourth list of permissions used by a second user account;
    compiling a fifth list of permissions granted to the second user account;
    subtracting the fourth list of permissions from the fifth list of permissions to generate a sixth list of excess permissions associated with the second user account;
    determining a second account-drift score of the second user account based on the sixth list of excess permissions;
    determining a group-drift score of a group by aggregating the first account-drift score and the second account-drift score; and
    identifying a second new configuration of permissions for the group in response to the group-drift score exceeding a second threshold value,
        wherein the second new configuration removes a permission from the second list of permission granted to the first user account and from the fifth list of permissions granted to the second user account, and
        wherein the group-drift score is reduced in response to removing the permission from the second list of permissions granted to the first user account, and in response to removing the permission from the fifth list of permissions granted to the second user account.

2. The automated process of claim 1, further comprising implementing the second new configuration of permissions for the first user account and the second user account to reduce the group-drift score.

3. The automated process of claim 1, wherein the permission removed from the second list and the fifth list controls access to a virtual distributed unit.

4. The automated process of claim 1, further comprising scoring a consistency of the group based on the third list of excess permissions and the sixth list of excess permissions, wherein the group includes the first user account and the second user account.

5. The automated process of claim 1, further comprising scoring a consistency of the group based on the third list of excess permissions associated with the first user account, based on the sixth list of excess permissions associated with the second user account, and in response to the group-drift score exceeding the second threshold value.

6. The automated process of claim 5, further comprising identifying a third new configuration of permissions for the group in response to the scored consistency of the group.

7. The automated process of claim 6, wherein the third new configuration of permissions omits the first user account from the group.

8. The automated process of claim 6, wherein the second new configuration of permissions includes a new group, the new group including the first user account and the second user account.

9. An automated process for managing permissions, comprising:
    generating a first list of excess permissions of a first user account belonging to a group;
    scoring a first account drift of the first user account based on the first list of excess permissions to generate a first account-drift score;
    configuring the first user account with a first new configuration of permissions in response to the first account-drift score exceeding a threshold value;
    generating a second list of excess permissions associated with a second user account belonging to the group;
    scoring a second account drift of the second user account based on the second list of excess permissions;
    scoring a group consistency based on the first account drift and the second account drift;
    identifying a second new configuration of permissions for the first user account and the second user account to increase the group consistency,
        wherein the second new configuration removes a permission from the first user account and from the second user account; and
    removing the permission from the first user account and the second user account to implement the second new configuration,
        wherein the scored group consistency is increased in response to removing the permission from the first user account, and in response to removing the permission from the second user account.

10. The automated process of claim 9, further comprising creating a new group including the first user account and the second user account to implement the second new configuration.

11. The automated process of claim 10, wherein removing the permission from the first user account and the second user account comprises removing the first user account and the second user account from the group.

12. The automated process of claim 11, wherein removing the first user account and the second user account from the group revokes access to a virtual distributed unit.

13. The automated process of claim 9, further comprising scoring a group drift of the group.

14. The automated process of claim 13, further comprising identifying the second new configuration in response to the group drift exceeding a second threshold value.

15. The automated process of claim 13, wherein the group drift of the group is based on the first account drift and the second account drift.

16. The automated process of claim 13, wherein the group drift of the group is based on the first list of excess permissions and the second list of excess permissions.

17. A system for managing permissions in a cloud-based network comprising a processor in electronic communication with non-transitory memory, the system comprising:
- a permission repository running on the cloud-based network;
- a permission manager running on the cloud-based network and in communication with the permission repository,
  - wherein the permission manager scores a first account drift using a first list of unused permissions associated with a first user account in a permission group,
  - wherein the permission manager scores a second account drift using a second list of unused permissions associated with a second user account in the permission group,
  - wherein the permission manager scores a group drift or a group consistency using the first account drift and the second account drift to generate a group-drift score for the permission group, and
  - wherein permission manager identifies a new configuration that removes a permission from the first user account and from the second user account,
  - wherein the permission manager revokes the permission from the first user account and the second user account in response to the group-drift score for the permission group exceeding a threshold value, and
  - wherein the group drift or the group consistency or the permission group is improved in response to removing the permission from the first user account, and in response to removing the permission from the second user account; and
- an access control system having the processor configured to read the permission from the permission repository and deny the first user account and the second user account access to a virtual distributed unit in response to the permission being revoked.

18. The system for managing permissions of claim 17, wherein the permission manager generates the new configuration of permissions including a new group with the first user account and the second user account being members of the new group in response to the group drift or the group consistency.

* * * * *